Figure 1:
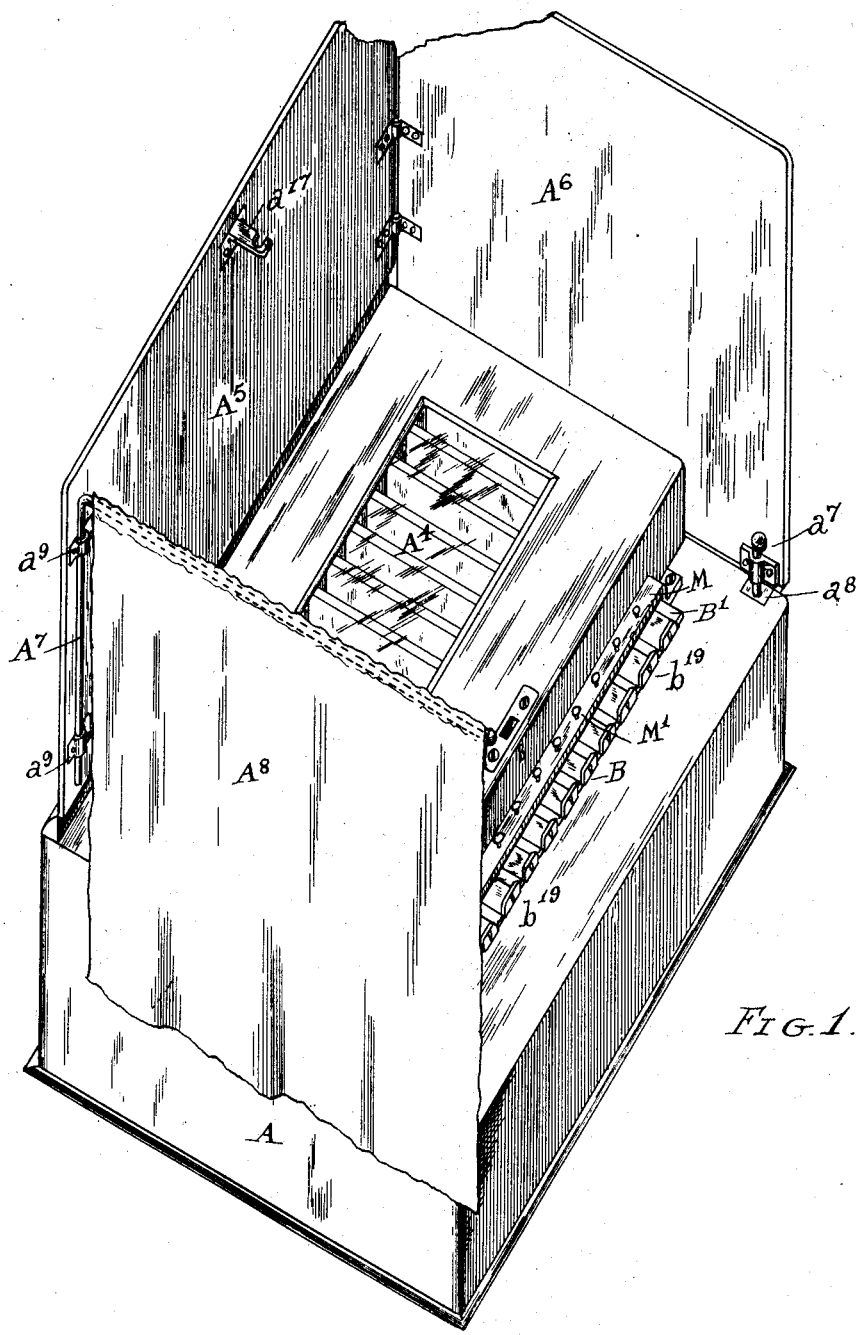

No. 667,807. Patented Feb. 12, 1901.
W. A. SWAREN.
VOTING MACHINE.
(Application filed June 12, 1900.)

(No Model.) 6 Sheets—Sheet 1.

Witnesses,
Frank G. Lister.
Frank Hudson

Inventor.
William A. Swaren.
By Atty N. DuBois.

No. 667,807. Patented Feb. 12, 1901.
W. A. SWAREN.
VOTING MACHINE.
(Application filed June 12, 1900.)
(No Model.) 6 Sheets—Sheet 3.

Witnesses.
Frank G. Lister
Frank Hudson

Inventor.
William A. Swaren.
By Atty N. DuBois.

No. 667,807. Patented Feb. 12, 1901.
W. A. SWAREN.
VOTING MACHINE.
(Application filed June 12, 1900.)
(No Model.) 6 Sheets—Sheet 4.

Witnesses
Frank G. Lister
Frank Knelton

Inventor.
WILLIAM A. SWAREN.
By Atty N. DuBois.

No. 667,807. Patented Feb. 12, 1901.
W. A. SWAREN.
VOTING MACHINE.
(Application filed June 12, 1900.)
(No Model.) 6 Sheets—Sheet 5.

Witnesses.
Frank G. Lister
Frank [illegible]

Inventor.
William A Swaren
By Atty N. DuBois.

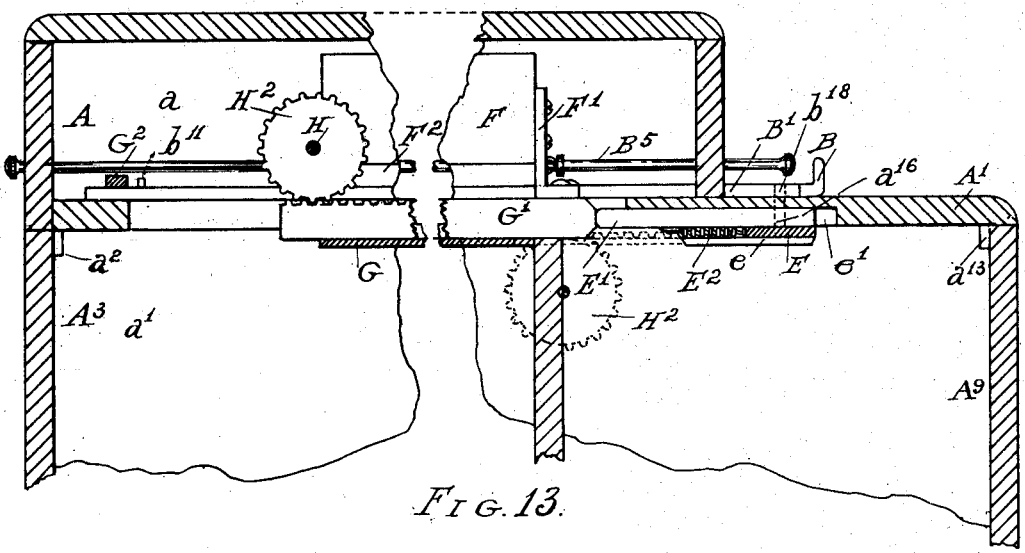

No. 667,807. Patented Feb. 12, 1901.
W. A. SWAREN.
VOTING MACHINE.
(Application filed June 12, 1900.)
(No Model.) 6 Sheets—Sheet 6.

Fig. 13.

Fig. 12.

|  | PRESIDENT | GOVERNOR | CONGRESS | CLERK OF COURT | COUNTY ATTY. | SURVEYOR | REFERENDUM | REFERENDUM |
|---|---|---|---|---|---|---|---|---|
| DEMOCRATIC | W.J. BRYAN | C.K. LADD | J.B. CROWLY | D.W. ODELL | H. BOGARD | D. REED | YES | YES |
| PROHIBITION | HALE JOHNSON | H. KEPLY | ROBT. KEELY | J.J. EOFF | S. GOOCH | H.C. EDGAR | NO | NO |
| REPUBLICAN | WM. McKINLEY | M.J. CALHOUN | A.H. JONES | E.E. LINDSAY | E. BAKER | G.B. WALKER | BLANK | BLANK |
| POPULIST | W.J. BRYAN | A.L. MAXWELL | CHAS. PALMER | B.V. CAREY | THOS. APGAR | T. NEWBOLT | Are you in favor of a perfect system of Voting? | Shall four Thousand Dollars be Raised by Taxation to Furnish the Court House? |
| BLANK | BLANK | BLANK | BLANK | BLANK | BLANK | BLANK | | |
| | | | | | | | | |
| | | | | | | | | |
| IRREGULAR | IRREG. | IRREG. | IRREG. | IRREG. | IRREG. | IRREG. | | |

Witnesses.
Frank G. Lister
Frank Hudson

Inventor.
WILLIAM A. SWAREN
By Atty N. DuBois.

UNITED STATES PATENT OFFICE.

WILLIAM A. SWAREN, OF CHICAGO, ILLINOIS, ASSIGNOR OF ONE-HALF TO HAMILTON C. KIBBIE, OF OBLONG, ILLINOIS.

VOTING-MACHINE.

SPECIFICATION forming part of Letters Patent No. 667,807, dated February 12, 1901.

Application filed June 12, 1900. Serial No. 20,031. (No model.)

*To all whom it may concern:*

Be it known that I, WILLIAM A. SWAREN, a citizen of the United States, residing at Chicago, in the county of Cook and State of Illinois, have invented certain new and useful Improvements in Voting-Machines, of which the following is such a full, clear, and exact description as will enable others skilled in the art to which it appertains to make and use my said invention.

My invention relates to voting-machines of that class which employ balls to be deposited in suitable receptacles for the purposes of determining the number and character of the votes cast.

The purposes of my invention are to provide a cabinet of novel and improved construction adapted to contain the operative mechanism of the voting-machine; to provide in connection with the cabinet means for screening the voter from observation during the operation of voting; to provide ball-boxes of novel and improved construction adapted to receive balls in rows, each full row containing an exact and invariable predetermined number of balls, (preferably ten,) said ball-boxes being so constructed and arranged that the balls may be counted without opening the boxes; to provide in connection with the cabinet a suitable receptacle to contain a supply of balls to be deposited in the ball-boxes; to provide means for locking the ball-boxes against unwarranted insertion or removal of balls; to provide means for separating and assorting balls preparatory to depositing them in the ball-boxes; to provide means for agitating the balls in the ball-hopper, so as to insure the filling of the holes in the cut-off plate; to provide means for sealing the ball-boxes; to provide means for automatically locking the ball-boxes whenever it is attempted to withdraw the boxes from the cabinet; to provide in the cabinet ball-boxes corresponding in number to the offices for which there are candidates to be voted for, including any measure for or against which a vote may be cast, said boxes being so constructed and arranged as to permit the voter to deposit a ball for or against or to deposit a ball indicating a purpose to refrain from voting for any candidate or measure presented or with respect to which the voter may be entitled to vote; to provide voting-slides of improved construction intermediate of the ball-receptacles and the ball-boxes, said slides being adapted to coöperate with the ball-boxes, as hereinafter set forth; to provide a suitable cut-off device to separate from the balls in the ball-receptacle those balls which are to enter the holes in the voting-slides and pass thence into the ball-boxes; to provide means for temporarily retaining in the holes in the voting-slides the balls received thereby until such time as the voter may completely determine the whole of his vote; to provide means for simultaneously depositing in the ball-boxes all of the balls for all of the candidates or measures for or with respect to which the voter may be entitled to vote; to provide means for assembling in separate ball-boxes all of the balls deposited for every candidate for each office, respectively, so that in case of contest the box containing all the ballots cast for all of the candidates for the same office may be removed and inspected without disturbing any of the other ball-boxes; to provide ball-boxes and ball-dropping devices so constructed and arranged and so coöperating with each other that the number of balls deposited will serve as a means for verifying the total number of persons who have voted; to provide means enabling the voter to record in writing and deposit irregular or special votes for or against independent special or irregular candidates or measures with respect to which he may wish to vote independently of the candidates named on the official ballot; to provide means affording to the voter absolute freedom of choice in voting for or against or in refraining from voting upon each and every candidate or measure with respect to which a vote may be cast; to provide means whereby a single voting-slide of a series of slides may serve to cast votes for all of the candidates regular, independent, or irregular for each office or measure to be voted upon, said slides being so constructed and arranged with respect to other parts of the mechanism as to permit the grouping of all the names of the candidates for any one office in a single place on the official ballot; to provide an official ballot of novel and improved form; to provide voting mechanism so constructed and arranged that all of the candidates of each party standing for different offices may be arranged upon the official ballot in separate lines—viz., all Democratic candidates in one line, all Republican candidates in another line, and so on, for all the different parties or interests affected by the operation of the machine; to provide means for limiting the simultaneous outward movement of all of the voting-slides, except the referendum-slides, so as to facilitate the voting of straight tickets; to provide in connection with ball-dropping devices and a coöperating signaling device means for cutting out and placing in disuse any of such ball-dropping devices as may be not needed for use at any particular election; to provide means to enable the voter to correct mistakes made in setting the ball-dropping mechanism; to provide means for simultaneously moving inward all of the voting-slides; to provide means for determining the several independent settings of the voting-slides; to provide means for testing whether or not the voter has set the voting-slide so as to enable him to cast every vote which he is entitled to cast, and to provide means for signaling the completion of the operation of voting.

With these ends in view my invention consists in the novel features of construction and combinations of parts shown in the annexed drawings, to which reference is hereby made and hereinafter particularly described, and finally recited in the claims.

Figure 2:
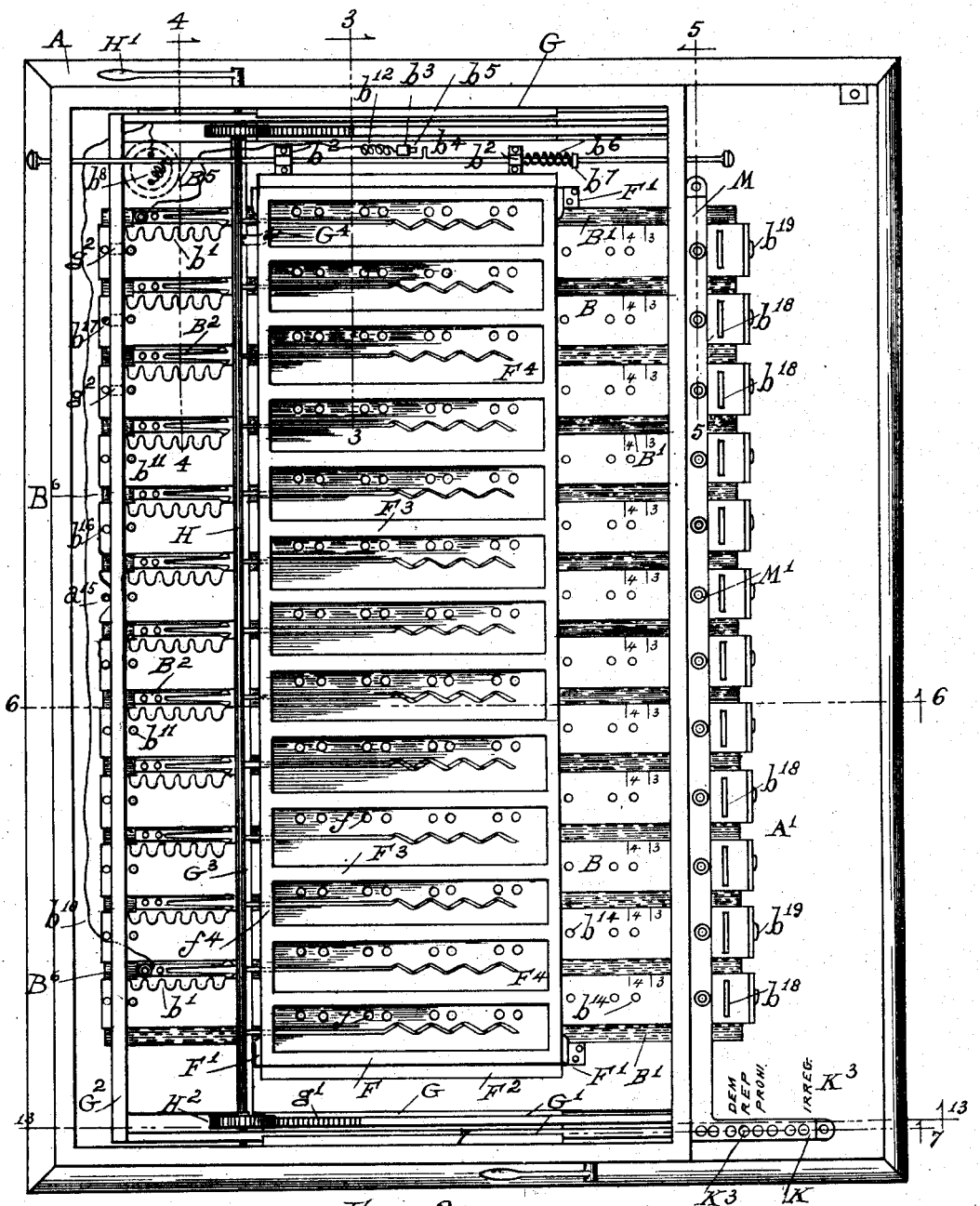
Figure 4:
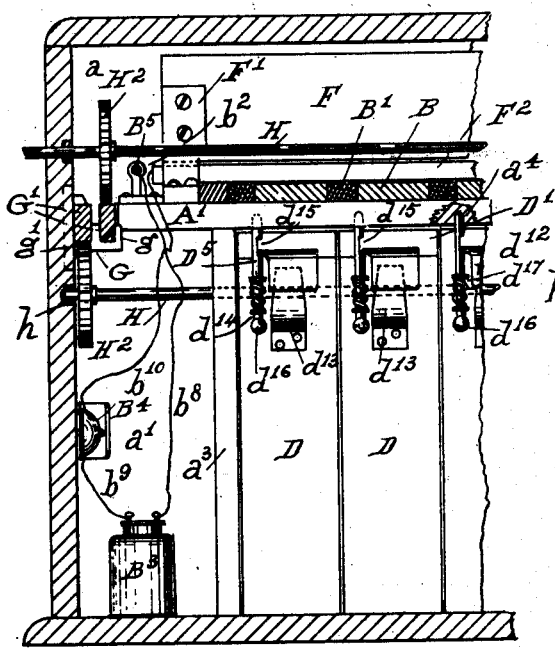
Figure 3:
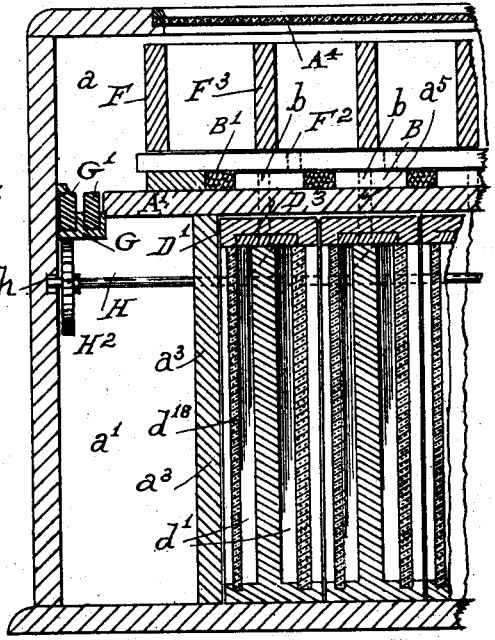
Figure 5:
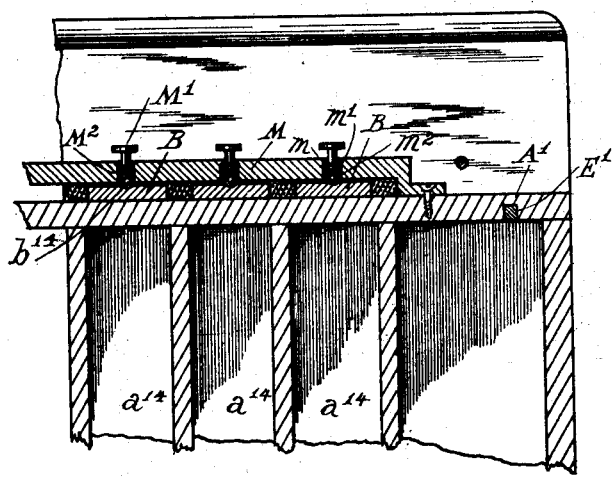
Figure 6:
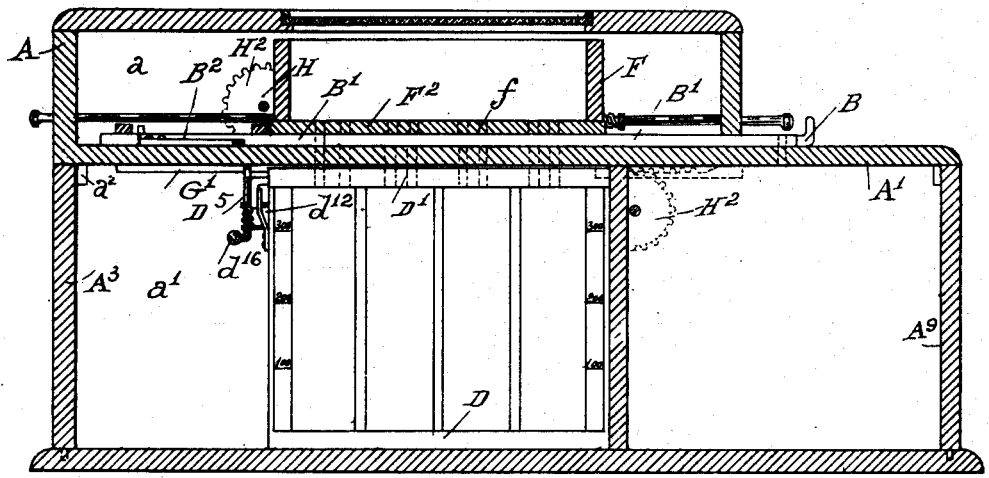
Figures 9, 10:
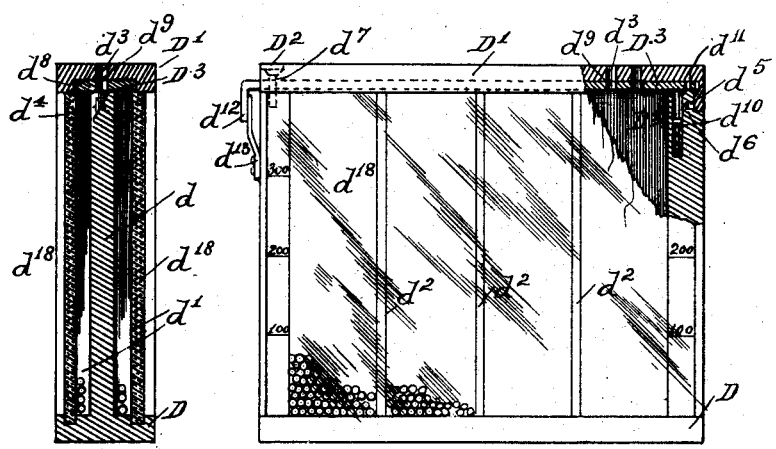
Figure 8:
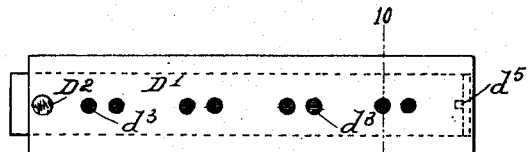
Figure 7:
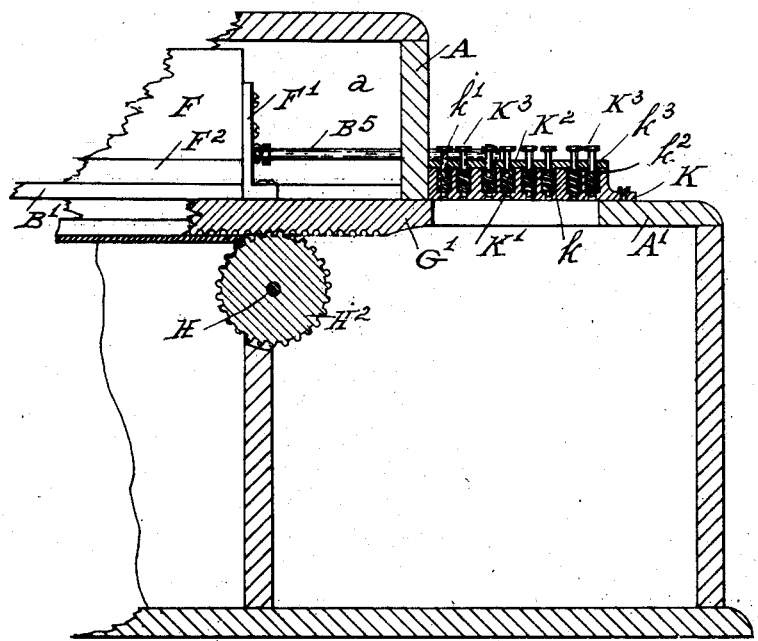
Figure 11:
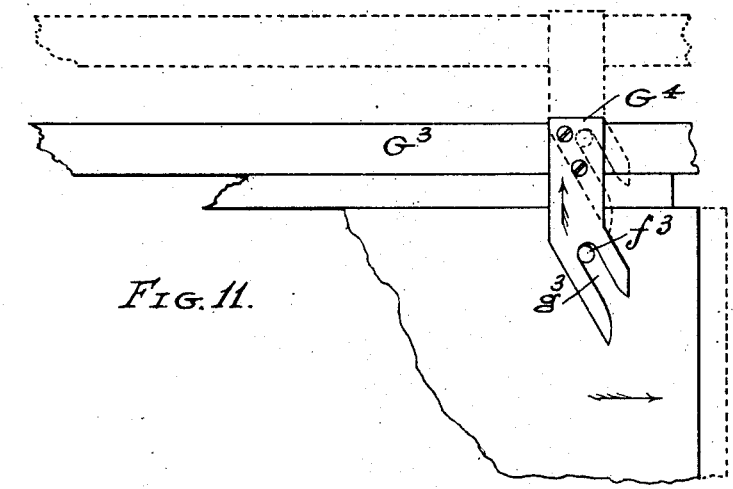

Referring to the drawings, in which similar letters of reference designate like parts in all of the views, Figure 1 is a perspective view of the complete apparatus with the screen extended. Fig. 2 is a top plan view of the apparatus, the screen and cover being removed so as to expose the mechanism contained in the cabinet. Fig. 3 is an enlarged partial vertical longitudinal section on the line 3 3 of Fig. 2. Fig. 4 is an enlarged partial vertical longitudinal section on the line 4 4 of Fig. 2. Fig. 5 is an enlarged partial vertical longitudinal section through the slide-setting devices and underlying parts on the line 5 5 of Fig. 2. Fig. 6 is an enlarged vertical transverse section on the line 6 6 of Fig. 2. Fig. 7 is an enlarged partial vertical transverse section through the voting-slide stops on the line 7 7 of Fig. 2. Figs. 8 and 9 are respectively a top plan and a side elevation of one of the ball-boxes. Fig. 10 is a vertical transverse section on the line 10 10 of Fig. 8. Fig. 11 is an enlarged partial top plan of the cut-off slide and the means for shifting same. Fig. 12 is an enlarged top plan of the official ballot. Fig. 13 is an enlarged partial vertical transverse section on the line 13 13 of Fig. 2.

The cabinet A is in the form of a rectangular box and is divided by a horizontal partition A', of hard rubber or other electric non-conductor, into an upper and lower compartment. The upper compartment $a$ contains the ball-receptacle F, the metallic voting-slides B, the guides B', of hard rubber or other electric non-conductor, and the means for operating the slides, as hereinafter explained. The lower compartment $a'$ contains the ball-boxes D and the mechanism for depositing written ballots.

In the back of the cabinet is a door $A^3$, secured by a lock $a^2$, the key to the lock being in the custody of the judges of the election. The ball-boxes D can only be inserted in the cabinet or removed therefrom by the persons having the key in charge. When the ball-boxes are in place and the door closed and locked, the door may be sealed in any suitable manner as a safeguard against tampering with the mechanism. In the front of the cabinet is a similar door $A^9$, secured by a lock $a^{13}$. The door $A^9$ may be opened only by an authorized official for the purpose of removing the written ballots deposited in the ticket-compartments in the lower part of the cabinet.

The central part of the lower compartment $a'$ is divided by transverse partitions $a^3$ into a series of chambers, and the ball-boxes are housed in these chambers.

The front part of the compartment $a'$ is subdivided into a number of smaller compartments $a^{14}$, adapted to contain the written tickets. The number of compartments $a^{14}$ is equal to the number of voting-slides.

The ball-boxes D are rectangular in form, and each box has two divisions separated by an intervening partition $d$, and each of these divisions is divided into compartments $d'$ by longitudinal partitions $d^2$. Each of these compartments is of such size as to accommodate balls in rows, each row containing an exact predetermined number of balls, usually ten balls in a row, the width of the compartments being exactly equal to the sum of the diameters of the balls contained in a row plus one-half of the diameter of one ball. This relation of the width of the compartments to the diameter of the contained balls is of the essence of my invention and is always maintained, no matter what may be the number of balls contained in a row. I prefer to place ten balls in a row, as by so doing a decimal scale placed on the outside of the box, as hereinafter explained, may be conveniently used in counting the balls contained in the box.

A cap D' fits on top of the box D and is pierced by holes $d^3$, equal in number to the number of compartments $d'$ in the box. The holes $d^3$ register with inclined ways $d^4$, sloping oppositely into opposite compartments of the box D. At one extremity of the cap D' is a lug $d^5$, fitting in a hole $d^6$ in the wall of the box. A countersunk screw $d^7$ or equivalent securing device serves to connect the cap with the box. A seal $D^2$, placed over the securing device $d^7$, prevents unauthorized removal of the cap. In the under side of the cap D' is a longitudinal channel $d^8$, which accommodates a closure $D^3$, slidable in the channel. The closure $D^3$ is pierced by a series of holes $d^9$, which are registrable with the holes $d^3$ through the cap D' and with the inclined ways $d^4$ in the partition $d$.

A spring-actuated pin $D^4$ is housed in the recess $d^{10}$ in the wall of the box, and when the closure $D^3$ is slid outward sufficiently to cover the holes $d^3$ the upper end of the pin enters a hole $d^{11}$ in the closure $D^3$ and locks the closure, so that it cannot be moved until the cap is removed and the locking-pin restored to its first position. The downturned end $d^{12}$ of the closure $D^3$ is acted against by a spring $d^{13}$, which serves to push the closure outward. A bolt $D^5$ slides in guides $d^{14}$ on the end wall of the box, and its upper extremity enters a hole $a^4$ in the part A' and serves to lock the ball-box in position in its chamber. A transverse notch $d^{15}$ in the bolt $D^5$ permits the closure $D^3$ to slide outward through the notch before the bolt is pushed down far enough to completely withdraw the upper end of the bolt from the hole $a^4$. Hence it will be seen that the closure will be pushed outward by the spring $d^{13}$ far enough to close the holes $d^3$ before the bolt $D^5$ can be withdrawn sufficiently to permit the withdrawal of the ball-box from the chamber in which it is housed. The bolt $D^5$ may be pushed downward by means of the knob $d^{16}$, so as to compress the spring $d^{17}$, and the spring will react to push the rod upward.

By reason of the construction and arrangement of parts just described any tampering with the ball-boxes is prevented, for whenever it is attempted to remove the boxes from their chambers any such attempt will result in the automatic closing and locking of the closures.

The side walls $d^{18}$ of the ball-boxes D are of glass or other transparent material, through which the balls contained in the boxes may be inspected. On the side walls of the boxes and covered by the glass are graduations "100," "200," "300," &c., so spaced and arranged as to indicate the number of balls contained in the compartments.

The length, breadth, and thickness of each of the compartments $d'$ are such as are necessary to accommodate a predetermined number of rows of balls, as indicated by the graduations, each full row containing an exact predetermined number of balls—no more and no less.

The ball-boxes D underlie the part A', and when the boxes are in position in their chambers the holes in the caps D' are in registry with corresponding holes $a^5$ in the part A'.

The voting-slides B are of metal and are pierced by holes $b$, which are in line and registrable one at a time with the holes $a^5$ in the plate A' by moving the slides inward or outward. The holes $b$ are so spaced that no two holes in the same slide may come into registry with the same hole $d^3$ opening into a compartment in a ball-box, and no two holes $d^3$ may be uncovered at the same time. Near the rear end of each slide is a hole $b^{16}$, registrable with a hole $a^{15}$ in the plate A'. In order to place any of the slides in disuse, a screw $b^{17}$ or equivalent securing device may be inserted in the holes $b^{16}$ and $a^{15}$, thereby securing the slide in such position that the signal may be sounded, but the slide cannot be moved into position to deposit balls. The slides slide between guides B' of hard rubber or other electric non-conductor. On one edge of each of the slides B is a series of teeth $b'$, separated by spaces, as clearly shown in the drawings. A series of forked metallic springs $B^2$ are secured in any suitable manner on top of the plate A', so as to permit vibration of the members of the springs. The slides B' terminate near the front ends of the springs $B^2$, and short supplemental slides $B^6$ are placed on the plate A' between the slides B.

An electric battery $B^3$ is suitably placed anywhere within the cabinet. An electric bell $B^4$ is secured in any suitable position within the cabinet.

A rod $B^5$ is slidable in guides $b^2$ on top of the plate A'. One end of the rod $B^5$ projects beyond the cabinet and is within reach of the judges of the election. The other end of the rod is within reach of the voter as he stands behind the screen in position for voting.

A binding-post $b^3$ is secured on top of the plate A'. A pin $b^4$ on the rod $B^5$ engages with a pin $b^5$ on the post $b^3$ when the rod is slid in its guides, as hereinafter explained. A spring $b^6$ surrounds the rod $B^5$ and acts against a collar $b^7$ to slide the pin $b^4$ away from the pin $b^5$ on the binding-post.

One pole of the battery $B^3$ is connected with the rod $B^5$ by a wire $b^8$. The other pole of the battery is connected with the bell $B^4$ by a wire $b^9$, and the bell is connected with the first forked spring in the series of forked springs by the wire $b^{10}$, and the last spring of the series of forked springs is connected with the binding-post $b^3$ by a wire $b^{12}$.

When any one of the holes $b$ through a slide B is in registry with a corresponding hole $a^5$ in the plate A', one member of the forked spring adjacent to the toothed edge of that slide will be in contact with one of the teeth on the edge of that slide and the other member of said spring will be in contact with the smooth edge of an adjacent slide. When a hole in the slide is not in registry with a hole in the plate, the extremity of one member of the spring will lie in a space between two teeth on the edge of the slide. When the slides are in such position that a tooth on every slide is in contact with a spring, there is a metallic connection or contact such as will permit an electric current to pass across the entire series of slides and springs, and if a member of any one of the springs is not in contact with a slide the connection will be broken, so that electric current cannot pass therethrough.

When all of the slides B have a hole $b$ in registry with a hole $a^5$, the complete electric circuit may be formed by sliding the rod $B^5$ so as to bring the pin $b^4$ into contact with the pin $b^5$. Current will then pass from the battery $B^3$ through the wire $b^8$ to the rod $B^5$, thence to the binding-post $b^3$, thence along the wire $b^{12}$, across the slides and springs to the wire $b^{10}$, and thence to the bell $B^4$ and will cause the sounding of the bell. This mechanism enables the voter to test the setting of the slides B, so as to make sure that every slide is in position to deposit a ball. If every slide is properly set, the signal-bell will sound; but if the voter fails to properly set any slide of the series the circuit will be broken, so that the signal cannot be sounded.

The judges of the election before moving the mechanism by means of which all the balls are deposited may slide the rod $B^5$ so as to test the setting of the voting-slides, as already described, and satisfy themselves that the voter has not failed to complete the operation of voting. When the rod $B^5$ is moved inward, the spring $b^6$ becomes compressed and the spring reacts to move the rod outward and normally holds the pins $b^4$ and $b^5$ out of contact.

A rectangular hopper F is supported within the cabinet by standards F', secured in any suitable manner on the plate A'. The lower edges of the hopper lie somewhat above the upper surface of the slides B and the guides B'. The plate A' is pierced by a number of series of holes $a^5$, overlying exactly the holes $d^3$ in the caps D' of the ball-boxes. A cut-off plate $F^2$, preferably made of hard rubber or other non-conducting material not easily affected by moisture, overlies the slides and guides, is slidable freely under the hopper, and is pierced by a number of series of holes $f$, which correspond in number to and are registrable with the holes $a^5$ in the plate A'. Transverse partitions $F^3$ are secured at their ends to the sides of the hopper and divide it into a series of transverse compartments. The partitions $F^3$, in conjunction with the cut-off plate $F^2$, serve to separate from the balls in the hopper those balls which are to enter the holes in the dropping-slides. When the plate $F^2$ is moved longitudinally to bring the holes $f$ into position to register with the holes $a^5$ in the part A', as hereinafter explained, the holes $f$ pass under and are covered by the partitions, so as to prevent more than one ball at the time from entering each of the holes $f$ and falling thence into the underlying ball-boxes.

When the parts are in the position shown in Fig. 2, balls from the hopper enter the holes $f$ in the plate $F^2$, one in each hole, and remain therein so long as the plate remains at rest. The slides may then be pushed inward or outward at will without bringing the holes $b$ into registry with the holes $f$. During this stage of operation the holes $b$ in the slides cannot come into position for balls to fall therethrough into the underlying ball-boxes; but after all of the slides are properly set the plate $F^2$ may be moved to the right to bring the holes $f$ in the plate $F^2$ into registry with the holes $b$ in the slides B, thereby causing balls to drop through those holes $b$ which are in registry with holes $d^3$ of the caps D' into the proper compartments in the ball-boxes D. The holes $f$ are in line with and registrable with the holes $a^5$ in the plate A'. They are also in line with the holes $b$ in the slides B, and the slides may be slid inward or outward to cause one hole in each of the slides to simultaneously register with one hole $a^5$ in the plate A' and to register with one hole $d^3$ in each of the caps D' of each of the ball-boxes D, thereby placing one hole $b$ in each slide (and only one) in such position that a hole $f$ in the plate $F^2$ may upon the right-hand movement of the plate be brought into registry therewith, so that balls may pass through the registering holes $f$, $a^5$, $b$, and $d^3$ into the ball-box D.

In order to make sure that a ball will enter every hole $f$ in the plate $F^2$, I provide stirrers $F^4$, which are suitably secured to the cross-piece $G^3$. The stirrers are sinuous or crooked for a part of their length. The straight parts of the stirrers pass through and are slidable in holes $f^4$ in the rear wall of the hopper, and one stirrer projects forward into each compartment of the hopper. When the cross-piece $G^3$ is moved inward or outward, it moves the stirrers, so as to stir the balls and cause one ball to roll into each hole in the plate.

The cut-off plate $F^2$ is preferably under the control of and operated by the judges of the election; but it may be operated by the voter if so desired. The settings of the slides B are under control of the voter, and he may, if he wishes, make as many different settings as there are different slides and may change the settings of the slides at pleasure. This feature is of great practical advantage, because it enables the voter to correct mistakes in voting or change his vote at will so long as he remains in position to move the voting-slides.

Brackets G, having longitudinal channels $g$ in their horizontal members, are secured to the inside of the end walls of the cabinet. Rack-bars G', having racks $g'$, slide freely in the channels $g$. The bars G' are in pairs. The bars of the outer pair, which are contiguous to the ends of the cabinet, have the racks $g'$ on their under side, and the bars of the inner pair have the racks on their upper side. A cross-piece $G^2$ connects the rear ends of the outer pair of bars, and a cross-piece $G^3$ connects the rear ends of the inner pair of bars. The cross-pieces $G^2$ and $G^3$ are both on the same level and are slidable above the slides B.

Longitudinal shafts H are mounted in suitable bearings $h$ on the end walls of the cabinet, and one end of each shaft projects through an end wall of the cabinet and is provided with a handle H', by means of which the shafts may be oscillated. Cog-wheels $H^2$ are secured to the shafts H and mesh with the racks $g'$ on the under sides of the outer pair of bars G' and the upper sides of the inner pair of bars G′, respectively. The rear handle H′ operates the inner pair of bars and their connecting cross-piece G³, and the front handle operates the outer pair of bars and their connecting cross-piece G². When the rear handle H′ is pushed forward, one pair of cog-wheels H² engages with the racks $g'$ on the upper side of the bars G′ to slide rearward the inner pair of bars and their connecting cross-piece. When the front handle H′ is pulled forward, one pair of cog-wheels H² engages with the racks $g'$ on the under sides of the outer pair of bars to slide them and their connecting cross-piece forward. Reverse movements of the handles H′ produce reverse movements of the cross-pieces G² and G³.

Pins $b^{11}$ are secured to and project vertically upward from each of the slides B and are engaged by the cross-pieces G² and G³ to move the slides inward or outward, as hereinafter explained.

Certain of the slides B (in this case the three slides nearest to the right-hand end of the machine as viewed from the front) are termed "referendum-slides" and are slidable forward or rearward independently of the rear cross-piece G², but are slid rearwardly simultaneously with all of the other slides by the front cross-piece G³ engaging with the pins on the slides. The rear cross-piece G² has on its under side transverse notches $g^2$, so placed that when the cross-piece moves forward or rearward the notches travel over the pins $b^{11}$ on the referendum-slides. Hence the cross-piece G² does not cause any movement of the referendum-slides. A plate G⁴, having an inclined fork $g^3$, is secured on top of the cross-piece G³ in such position that the pin $f^3$ on the plate F² may enter the fork. When the bar G³ moves rearward, the left-hand inclined side of the fork $g^3$ as viewed from the front engages with the pin $f^3$, so as to move the plate F² to the right, as indicated in dotted lines in Fig. 11, and in like manner forward movement of the bar causes the plate to move to the left.

In the drawings I have shown a series of twelve voting-slides and a corresponding number of ball-boxes and coöperating parts, and I have shown each slide as having four perforations and each ball-box as having eight compartments; but a greater or less number of slides having a greater or less number of perforations and a greater or less number of ball-boxes having a greater or less number of compartments may be used without departing from my invention.

The number of voting-slides and corresponding parts may be varied to suit the circumstances of each particular case. Supernumerary slides or slides not needed at any particular election may be cut out or placed in disuse, as hereinbefore set forth. In practice it is found best to have the number of slides equal to the number of offices for which there are candidates to be voted for, plus such number of referendum or initiative slides as may be necessary to enable the voter to record his vote for or against any referendum measure or initiative proposition proper to be voted upon or to record his purpose to refrain from voting for any candidate for any of said offices or for or against any proposition proper to be voted upon.

Each ball-box represents an office or measure and must have a separate compartment to receive balls to be deposited for each candidate for that office or balls to be deposited for or against each measure represented by that ball-box, and should also have one or more additional compartments to receive balls to be deposited to tally with the written or irregular votes cast by means of the slide coöperating with that ball-box, or balls to be deposited to indicate a purpose to refrain from voting with respect to any office or measure represented by that ball-box. For example, if there are seven candidates for the office of sheriff then the box underlying the slide used in voting for the office of sheriff must have seven or more compartments in order that there may be a separate compartment to contain the ballots which may be cast for each of said candidates, respectively, and there may also be additional compartments to receive balls tallying with the irregular votes cast by the voter, and balls deposited to indicate his purpose to refrain from voting with respect to the office or measure represented by that slide and that ball-box.

Each of the slides B may have as many holes $b$ as there are compartments in the ball-box with which it is usable, or a less number of holes in the slides may be so disposed that one hole will serve to admit balls to two or more compartments in the box; but in any case the holes $b$ must be so placed that not more than one hole $d^3$ opening into a compartment in a box will be uncovered at one time.

In order to enable the voter to vote a straight ticket, it is desirable that all of the slides except the referendum-slide may be moved outward simultaneously and stopped with one hole in each slide in registry with one hole, and only one, opening into a compartment in each of the ball-boxes, thus relieving the voter from the trouble of setting each of the slides separately.

The means for stopping all of the slides except the referendum-slide with one hole in each slide in registry with one hole only opening into one compartment only of each ball-box will now be described. An angle-plate K is suitably secured on top of the part A′ in line with the outside rack-bar G′. Springs K′ are housed in recesses $k$ in the plate K. A cap K² is suitably secured on the plate K. The stems $k'$ of keys K³ slide freely in vertical holes $k^3$ in the plate K and the cap K². The number of the keys K³ is equal to the number of compartments in one ball-box—in this case eight. Pins $k^2$ on the stems $k'$ engage with springs K′ to compress the springs when the keys are pressed downward and the springs react to raise the keys. The stems of the keys $K^3$ are in line with one of the outer rack-bars $G'$. If one of the keys K be pressed down while the rack-bar is moving outward, the end of the rack-bar will strike against the stem of the key and the outward movement of the bar will be stopped. All of the slides except the referendum-slides may be pushed simultaneously outward by the bar $G^2$ engaging with the pins $b^{11}$ on the slides. The bar $G^2$ is connected to and moves with the rack-bars $G'$. Hence the stopping of the rack-bar will cause the stopping of all of the slides except the referendum-slides.

In the drawings I have given to some of the keys the designations "Rep.," "Dem.," and "Pop.," signifying the Republican, Democratic, and Populist parties, respectively. Other appropriate designations may be given to the other keys.

If it is desired to vote for the Republican candidate for every office enumerated on the official ballot, the key designated "Rep." may be pressed down so that the front end of the rack-bar $G'$ will abut against the stem of that key, thereby stopping all of the slides in the same position—that is to say, with a hole in each slide registering with a hole in each compartment intended to receive balls to be cast for the Republican candidate for each office. In like manner if the voter wishes to vote the straight Democratic or Populist ticket he will press down the key marked "Dem." or "Pop.," as the case may be.

Although all of the slides may be simultaneously moved outward by the bar $G^2$, the voter may at pleasure move them separately inward or outward and set them in any desired position.

After the bar $G^2$ has been moved forward to push all of the slides simultaneously outward, as just described, the front handle $H'$ may be moved forward, so as to cause the rack-bars $G'$ to carry the cross-bar $G^2$ rearward to its initial position. After the bar $G^2$ has been moved rearward, as described, any or all of the slides may move freely inward or outward and may be stopped at any desired stage of their movement within the limit of the distance between the bars $G^2$ and $G^3$.

All of the slides may be moved simultaneously inward by pulling forward the right-hand handle $H'$, thereby causing the bar $G^3$ to engage with the pins $b^{11}$ on all of the slides and move all of the slides inward.

After all of the slides have been pushed inward the rear handle $H'$ may be moved rearward to cause the bar $G^3$ to return to its initial position. Any of the slides may then be freely moved inward or outward within the limits of the distance between the bars $G^2$ and $G^3$.

From the foregoing it will be seen that the voter has absolute control of the setting of the slides and may set them collectively or independently in any desired position.

To facilitate and determine the various independent settings of the slides B, I preferably employ means which I will now describe. A bar M, suitably secured on top of the plate $A'$, extends longitudinally above the slides B, and the slides are slidable under the bar. Bolts $M'$ are slidable in vertical holes $m$ in the bar M, said holes being directly above slight depressions $b^{14}$ in the slides. Springs $M^2$ are housed in recesses $m'$ in the bar and surround the bolts $M'$. Pins $m^2$ pass through the bolts $M'$ and the springs act against the pins to push the bolts downward. The lower extremities of the bolts are rounded and enter the shallow depressions $b^{14}$, which are of such depth that the seating therein of the rounded lower ends of the bolts will be sensible to the touch of the person manipulating the slide; but they are not deep enough to cause the bolts to lock the slides. The number of depressions in each slide is equal to the number of compartments in the box with which the slide is usable. The construction and arrangement of the parts are such that the slides may be moved to and fro under the bolts, and every time a hole $b$ in a slide comes into registry with a hole $a^5$ a bolt will enter one of the depressions $b^{14}$ and will thereby impede the movement of the slide sufficiently to apprise the voter as to the position of the slide. The various independent settings of the slides may, however, without departing from my invention be indicated by other means—such, for example, as pointers $b^{19}$ at the front ends of the slides, respectively, which may by moving the slides inward or outward be made to point to the name of the candidate for whom the voter wishes to cast his vote. Whenever a pointer $b^{19}$ points to any name on the official ballot, the slide on which the pointer is mounted will have a hole $b$ in registry with a hole $d^5$ opening into a compartment in a ball-box set apart to receive balls to be deposited for that particular candidate for the office represented by the slide. The various independent settings of the slides may also be indicated by graduations "1," "2," "3," &c., on the slides themselves, successively registrable with the lower front edge of the bar M or with suitably-placed pointers contiguous to the slides.

From the foregoing it will be seen that the voter may be guided both by the sense of touch and the sense of sight in setting the slides, thus having a double safeguard against mistakes.

If the voter does make a mistake in setting the slides, he may correct same at any time before the deposit of the ball in the ball-boxes. This is of great practical advantage, because it gives the voter an opportunity to review his vote and make sure that everything is right before the balls are finally deposited in the ball-boxes.

There are cases in which a voter may wish to vote for a person or persons whose name or names are not found on the official ballot. In order to enable the voter to cast such irregular vote, I provide means which I will now describe. Each of the slides B has a transverse slit $b^{18}$, which registers with a corresponding slit $a^{16}$ in the part A' when the slides B are pushed inward to their full limit. Each of the slits $b^{18}$ is directly over a ticket-compartment $a^{14}$, so that tickets passed through the slit will fall into the underlying compartment. When a slide is set with its slit $b^{18}$ in registry with a slit $a^{16}$, a hole $b$ in that slide will be in registry with a hole opening into a special compartment in a ball-box set apart to receive balls designating the deposit of tickets through that slit, so that for every ticket deposited a ball will also be deposited in the corresponding special compartment, and at the counting of the ballots the number of balls deposited in the special compartments must tally exactly with the number of tickets deposited. A plate E is supported in guides $e$ on the under side of the part A' and is slidable in said guides in a direction transverse to the machine. In line with the inner pair of rack-bars G' and contiguous to the front ends thereof are bars E', which are supported and slidable longitudinally on the brackets G. The plate E is secured at its ends to the bars E' and slides with the bars. Springs $E^2$ have one end connected with the bars E' and the other end immovably secured in any suitable and convenient manner. When the rack-bars G' are caused to slide forward by moving the rear handle H' rearward, as already described, the front ends of the bars G' engage with the rear ends of the bars E' and push the bars E' forward until they stop with the plate E directly under the slits $a^{16}$ in the part A' and close the slits, so that tickets cannot be inserted through the slits into the underlying ticket-compartments. The plate E remains in this position during the time that the voter is preparing his vote and setting the voting-slides and until the judges of election push forward the rear handle H' to cause the deposit of balls in such compartments in the ball-boxes as may be necessary to properly record the vote cast by the voter. While the plate E remains in position under the slits $a^{16}$ the springs $E^2$ are stretched, and when the bars G' slide rearward the springs react to slide the plate E rearward, so as to open the slits. When the slide B is in position for the insertion of a ticket in the slit $b^{18}$, the slide overlies and closes all of the holes opening into compartments in the corresponding ball-box, excepting the hole opening into the special compartment designed to receive balls to be deposited coincidently with the deposit of tickets. A ticket inserted in a slit $b^{18}$ cannot fall into a ticket-compartment $a^{14}$ until the plate E is withdrawn from under the ticket, and this can only occur when the bar G is moved to shift the plate $F^2$ so as to bring the proper hole in the plate into registry with a hole opening into a special compartment designed to receive balls to be deposited correspondingly with the deposit of a ticket. Should the voter attempt to move the slide after inserting a ticket in the slit, the movement of the slide would cause the withdrawal of the ticket from the slit and would also move the hole in the slide out of registry with the hole opening into the special compartment intended to receive balls corresponding to the tickets. From the foregoing it will be seen that it is impossible for the voter to cast an irregular vote by ticket and then cast a regular vote by ball-ballot.

In order to cast irregular votes, or votes for or against candidates or measures not named on the official ballot, the voter selects the slide corresponding to the office or measure with respect to which he wishes to vote. He then pushes the slide inward until the slit $b^{18}$ is in registry with a slit $a^{16}$. A supply of tickets suitably shaped to pass through the slits $b^{18}$ into the compartments $a^{14}$ having been previously provided, the voter takes a ticket and writes thereon the name of the person for whom he wishes to vote for the office represented by the slide, or if the slide represents an initiative or referendum measure he writes on the ticket his preference with respect to the initiative or referendum measure represented by the slide. He then inserts the written ticket through the slit $b^{18}$ into the slit $a^{16}$, where it remains supported by the plate E until the plate is withdrawn, as hereinbefore described, and so on for each slide representing an office or measure with respect to which he wishes to vote irregularly.

In the top of the cabinet A, directly over the hopper F, is a transparent plate $A^4$, through which the balls in the hopper may be seen, enabling the voter to ascertain by inspection whether or not the hopper contains a supply of balls sufficient for the purpose of voting.

A cover $A^5$ has a hinge connection (not shown) with the rear upper edge of the cabinet. A wing $A^6$, of any suitable material, sufficient to serve as a screen has a hinged connection with one end of the cover $A^5$, and when the cover occupies a vertical position the wing may be turned outward on its hinge until it occupies a vertical position just above the right-hand end of the cabinet, and it may be secured in that position by a bolt or latch $a^7$ on the wing engaging with a notched plate $a^8$ in the top of the cabinet. Near the left-hand end of the cover $A^5$ are eyes or sockets $a^9$, in which the vertical member of an L-shaped rod $A^7$ turns. A curtain $A^8$, of any suitable fabric, is supported on the horizontal member of the rod $A^7$. The L-shaped rod and the curtain thereon form a screen for the left-hand end of the cabinet.

The wings $A^6$ and $A^8$ may be turned inward until they lie parallel to the cover $A^5$, and the cover may then be turned down so as to cover the cabinet, the wings lying between the cover and the top of the cabinet. The parts $A^5$, $A^6$, and $A^8$ when extended form a screen which protects the voter from observation on three sides, and when the voting-machine is not in use the screen may be compactly folded in connection with the cabinet, so that the machine as a whole is of a compact form most convenient for handling or transportation.

A suitable lock $a^{10}$ serves to secure the door $A^4$, so that it can be opened only by duly-authorized persons. A suitable securing device $a^{17}$ secures the cover $A^5$ on the cabinet, so as to prevent accidental displacement of the cover.

The form of the official ballot usable with the machine is clearly shown in Fig. 12. The names of all candidates of each party are arranged in lines running lengthwise of the machine—that is to say, all the Democratic candidates in one line, all of the Republican candidates in another line, and so on for the candidates of all the parties.

The names of all of the candidates for each office are arranged in a single row running transversely to the machine—that is to say, all of the candidates for president in one row, all of the candidates for governor in another row, and so on for every office named on the ballot. That part of the ballot usable with the referendum-slides has the words "Yes," "No," or "Blank," or equivalent words, arranged in lines—viz., all of the words "Yes" in one line, all of the words "No" in another line, and all of the words "Blank" in another line. In each referendum-row is inscribed a statement of the subject or measure submitted to be voted upon.

In practical use the official ballot is placed on top of the part $A'$ parallel to the bar M and with a row of names directly in line with each voting-slide B. In order to place the several slides in position to deposit balls for the candidates of his choice, the voter merely moves the slides into such position that the pointer on each slide points to the name of the candidate of his choice for the office represented by that slide.

The operation of the machine is as follows: The cabinet is placed in position for use, and the screens are extended, as hereinbefore described. The proper officials then place a sufficient supply of balls in each compartment of the hopper F and provide a supply of tickets for irregular voting. They then close and lock the door $A^4$, then inspect all of the ball-boxes D to see that no balls are contained therein and inspect the ticket-compartments to see that no tickets are contained therein, then place the ball-boxes in their respective chambers, then push in the closures $B^3$ and secure them in position by inserting the upper end of the bolts $D^5$ in the holes in the part $A'$, then lock the door $A^3$, so as to prevent unauthorized persons from tampering with the ball-boxes, and then close and lock the door $A^9$. This being done, the machine is in readiness for use. The voter wishing to vote takes his place at the machine and if he desires to vote the straight ticket presses down the key $K^3$ having the designation of the party of his choice, and while holding the key down he pulls forward the handle $H'$ on the left-hand end of the machine, thereby causing all of the slides B to stop with one hole in each slide in registry with a hole opening into a compartment of a ball-box corresponding to each candidate enumerated on the ticket of his choice. He then pushes the rod $B^5$ inward for the purpose of testing whether or not every slide has a hole in registry with a compartment in a ball-box. If the signal-bell sounds when the rod $B^5$ is pushed inward, he knows that all of the slides are properly set. If the signal-bell does not sound, he is apprised that some one or more of the slides are not properly set to deposit his vote as he wishes to cast it. He may then test the slides one by one until he finds the erroneous setting, and when he corrects it the signal will sound and he will be apprised that everything is in readiness for the deposit of the balls in the ball-boxes. He then retires, whereupon the duly-authorized official pushes forward the right-hand handle $H'$, thereby causing the deposit of a ball into each compartment of a ball-box which is in registry with a hole $f$ in the plate $F^2$. If the voter wishes to vote a mixed ticket, he will pull forward the left-hand handle $H'$, thereby causing all of the voting-slides to move outward. He will then push inward each slide representing the office for which a candidate is named for whom he wishes to vote until the slides respectively stop with a hole in each slide in registry with a hole opening into a compartment in a ball-box set apart for the candidates of his choice, and he will thus adjust each slide for each successive candidate of his choice for the different offices, respectively. If he wishes to refrain from voting for any candidate for any specific office, he will set the slide representing that office so that a hole in the slide will register with a hole in the ball-box opening into a "no-vote" compartment designed to receive ballots of that kind. If he wishes to vote for a candidate not named on any of the tickets, he will push in the slide representing the office for which the person of his choice stands until the slit $b^{18}$ in that slide registers with a slit $a^{16}$. He will then write upon a ticket the name of the person for whom he wishes to vote and insert the ticket in the slit $b^{18}$. If he desires to vote for or against any referendum measure or to record his purpose to refrain from voting thereon, he will pull out the referendum-slides and set them in such position, respectively, that a hole in each slide will register with a hole in its corresponding ball-box, so as to permit the deposit of a "yes" or a "no" or a "no-vote" ballot, as he may elect. For the purpose of testing the correctness of the setting of the slides he will inspect each slide carefully and see that the pointer on the slide points to the name of the candidate for whom he wishes to vote for the office represented by that slide. In order to make sure that a hole in each slide is in registry with a hole opening into a ball-box, he will test each slide to see that a bolt M' is seated in a depression $b^{14}$ in that slide. He will then further test the setting of the slides by pushing in the rod $B^5$, which will cause the signal-bell to sound if all of the slides are properly set. If the bell fails to sound, some slide has been overlooked or improperly set, and he may then correct the setting of the slide, whereupon the signal-bell will ring upon applying test. The handle H' may then be moved forward, thereby causing a ball to be deposited for each candidate or measure of his choice and causing a ball to be deposited in each case in which he deposits a written ticket or elects to refrain from voting.

Having fully described my invention, what I claim as new, and desire to secure by Letters Patent, is—

1. In a voting-machine, the combination of a cabinet, ball-boxes housed in said cabinet, slides having holes registrable with holes opening into compartments in said ball-boxes also having pointers, a ballot having a series of lines of names, each line containing the names of all the candidates of one party for every office named on the ballot, also having a series of rows of names, each row containing the names of all of the candidates of every party for one office, said ballot being so placed that when the pointer on a slide points to a name on the ballot a hole in that slide is in registry with a hole opening into a compartment designated to receive balls to be deposited for the person whose name is indicated by the pointer, as set forth.

2. In a voting-machine, the combination of a base having holes in series, the number of said series being equal to the number of parties having candidates to be voted for, insulated slides corresponding in number to the number of offices or measures to be voted upon and having holes registrable with the holes in said base, circuit-closers engaging with said slides, a signaling device, a closer on said base, and a battery having electrical connection with said last-named closer and with said circuit-closers, slides, and signaling device, as set forth.

3. In a voting-machine, the combination of a cabinet, ball-boxes housed in said cabinet, voting-slides having holes registrable with holes opening into compartments in said ball-boxes, a hopper above said slides, a reciprocative cut-off plate between said hopper and said slides and stirrers adapted to stir the balls in said hopper, as set forth.

4. In a voting-machine, the combination of a cabinet, ball-boxes housed in said cabinet and provided with closures, and securing devices connecting said ball-boxes with said cabinet and adapted to release the closures of said ball-boxes, as set forth.

5. In a voting-machine, the combination of a cabinet, ball-boxes housed in said cabinet, closures on said ball-boxes, securing devices connecting said ball-boxes with said cabinet and adapted to retain said closure in open position and a locking device adapted to lock said closure in closed position, as set forth.

6. In a voting-machine, the combination of a cabinet having a series of ticket-compartments and having slits opening into said compartments, ball-boxes housed in said cabinet and each having a ball-compartment corresponding to one of said ticket-compartments, and a series of slides each having a hole registrable with a hole opening into a compartment of a ball-box and each having a slit registrable with a slit opening into one of said ticket-compartments coincidently with the registry of the hole in said slide with a hole opening into a compartment in a ball-box, as set forth.

7. In a voting-machine, the combination of a cabinet, ball-boxes housed in said cabinet, slides coöperating with said ball-boxes, means for determining the independent settings of said slides and means for testing the setting of all of said slides, as set forth.

8. In a voting-machine, the combination of a cabinet, ball-boxes housed in said cabinet and having compartments, conductive slides having holes communicating one at a time with the compartments in said ball-boxes, means for insulating said slides from each other, an electric battery and a signaling device electrically connected with said slides, means electrically connecting said slides with each other and a circuit-closer for closing or breaking the electric circuit, as set forth.

9. In a voting-machine, the combination of a cabinet, a series of ball-boxes housed in said cabinet each having compartments, a series of insulated and perforated slides in operative relation to said ball-boxes, means for electrically connecting said slides, means for simultaneously moving all of said slides into such position that a hole in each slide will be in communication with a compartment in each ball-box, and means for closing the electric circuit, as set forth.

10. In a voting-machine, the combination of a cabinet, having ticket-compartments and slits opening into said compartments, ball-boxes housed in said cabinet, slides in operative relation to said ball-boxes and having slits registrable with the slits opening into the compartments in said ball-boxes, bars slidable in the longitudinal direction of said slides, slidable bars in line with and acted against by said first-named bars, a plate secured to said last-named bars below the slits in the cabinet, and means for automatically retracting said plate, as set forth.

11. In a voting-machine, the combination of a cabinet, ball-boxes housed in said cabinet, slides in operative relation to said ball-boxes, slidable bars parallel to said slides, a cross-bar connecting said slidable bars and engaging with said slides to move them forward and movable stops in line with and serving to stop the forward movement of said slidable bars, as set forth.

12. In a voting-machine, the combination of a cabinet, ball-boxes housed in said cabinet, slides in operative relation to said ball-boxes, pins on said slides, slidable rack-bars, a cross-piece connecting said rack-bars and engaging with the pins on said slides, an oscillative shaft transverse to said rack-bars, a handle on said shaft, cog-wheels on said shaft meshing with the racks on said rack-bars, movable stops in line with said rack-bars, and means for automatically retracting said keys, as set forth.

13. In a voting-machine, the combination of a cabinet, a cover hinged on said cabinet, wings mounted to swing on said cover and a securing device securing the cover and connected wings on said cabinet, as set forth.

14. In a voting-machine, the combination of a cabinet, ball-boxes, conductive slides in operative relation to said ball-boxes, means for insulating said slides, a battery and a signaling device electrically connected with said slides, means for securing one or more of said slides in electric circuit, and means for closing the electric circuit, as set forth.

15. In a voting-machine, the combination of a cabinet, ball-boxes housed in said cabinet, toothed slides in operative relation to said ball-boxes, forked springs engaging with the teeth on said slides and a battery and a signaling device electrically connected with said slides, as set forth.

In witness that I claim the foregoing as my invention I have hereunto subscribed my name, at Oblong, Illinois, this 5th day of May, 1900.

WILLIAM A. SWAREN.

Witnesses:
   G. W. BROCKWAY,
   W. P. CLAYPOOL.